Jan. 10, 1961     C. E. PARKER     2,967,630
APPARATUS FOR HANDLING RIGID SHEET MATERIAL
Filed Feb. 26, 1958     4 Sheets-Sheet 1

United States Patent Office 2,967,630
Patented Jan. 10, 1961

2,967,630

APPARATUS FOR HANDLING RIGID SHEET MATERIAL

Clarence E. Parker, deceased, late of Painesville, Ohio, by Frieda Parker, executrix, Painesville, Ohio, assignor to The Coe Manufacturing Company, Painesville, Ohio, a corporation of Ohio Filed Feb. 26, 1958, Ser. No. 717,744

5 Claims. (Cl. 214—6)

The present invention relates to apparatus for handling rectangular articles and more particularly to apparatus for forming bundles of two or more articles; for example, plaster laths or the like.

During the manufacture of many articles, such as plaster lath, it is customary to finish one side and not the other, and to package the articles in bundles for subsequent handling and sale with the finished sides of the top and bottom articles turned inwardly with respect to the bundle so as to better protect them from damage.

One of the principal objects of the invention is the provision of a new and novel material handling apparatus which will receive rigid rectangular sheet-like articles having a finished side and a non-finished side, such as plaster laths, fed thereto by a conveyor, and arrange the articles in bundles suitable for subsequent handling with the finished sides of the top and bottom laths facing inwardly of the package.

Another object of the invention is the provision of a new and novel apparatus of the character referred to which will be simple in construction, capable of high speed operation and which will handle the articles being packaged without damage even though they may be relatively fragile.

The invention resides in certain constructions and combinations and arrangements of parts and future objects and advantages will be apparent to those skilled in the art from the following description of the preferred embodiment described with reference to the accompanying drawings forming a part of this specification, in which similar reference characters designate corresponding parts, and in which.

Figure 1:
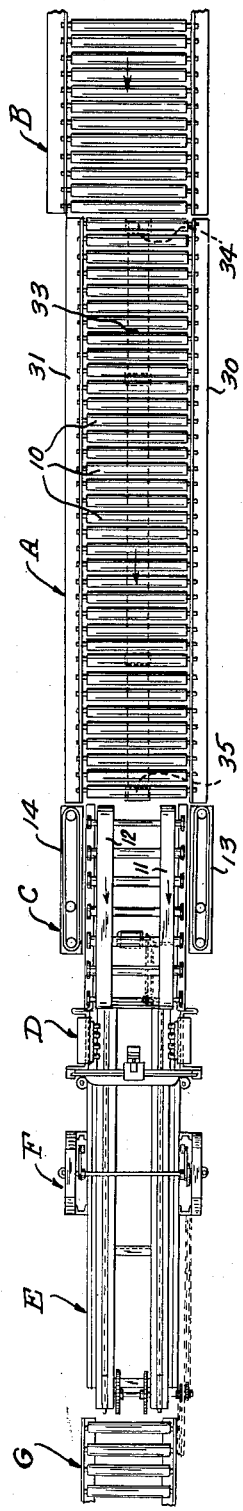
Fig. 1 is a plan view of an apparatus embodying the present invention and designed to handle plaster lath.
Figure 2:
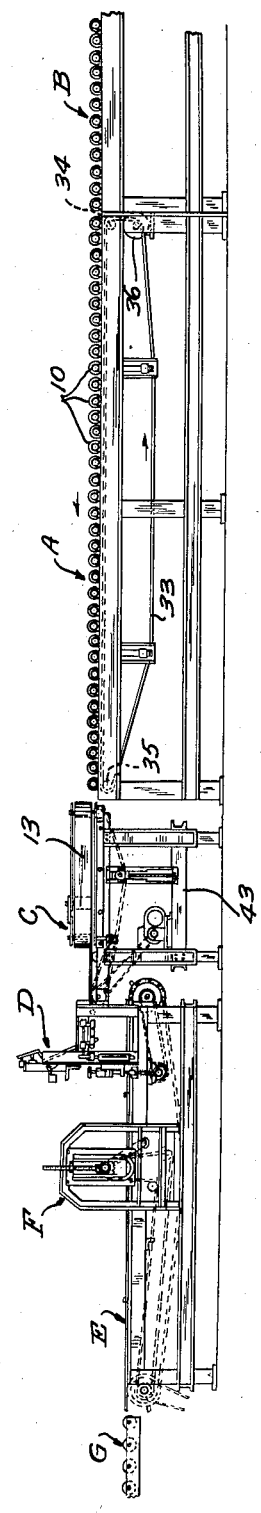
Fig. 2 is a side elevational view of the apparatus shown in Fig. 1.
Figure 4:
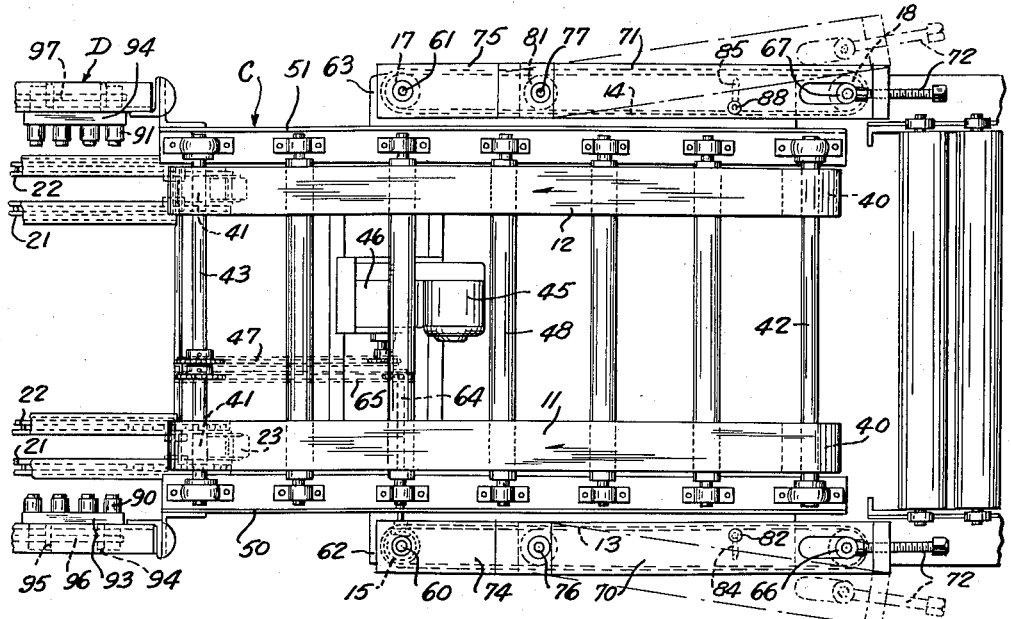
Fig. 4 is a side elevational view of the apparatus shown in Fig. 3.
Figure 3:
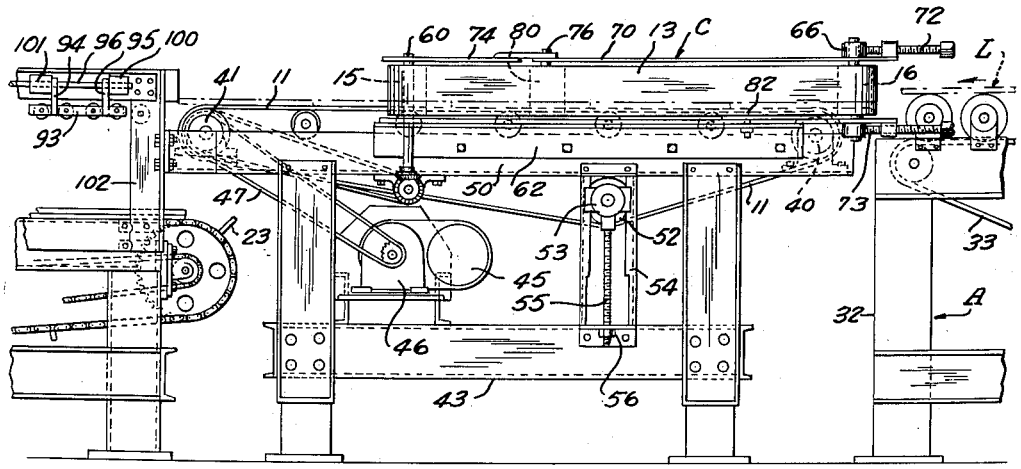
Fig. 3 is an enlarged fragmentary plan view of a portion of the apparatus shown in Fig. 1.

The invention is herein shown and described as embodied in an apparatus for handling and packaging plaster laths, having a finished or face side and a non-finished side. Each package comprises two or more laths having the finished sides of the top and bottom laths turned inwardly of the bundle. The laths are fed sidewise to the apparatus, with their finished sides down. It is, however, to be understood that the invention is not limited to the particular apparatus herein shown and described, but may be otherwise embodied.

Generally speaking, the apparatus shown comprises a driven conveyor section A comprising a plurality of driven rolls 10 and is adapted to receive plaster laths designated L fed thereto by a conveyor B with their finished sides down and while moving in a direction transversely of their lengths. From the conveyor section A, the laths advance to an aligning conveyor section C comprising driven horizontal belts 11, 12 having driven lath aligning vertical belts 13, 14 along opposite sides of the conveyor; that is, adjacent to opposite sides of the horizontal belts 11, 12. The belts 13, 14 are reeved about pairs of pulleys 15, 16 and 17, 18 respectively having their axes vertical and align the laths at right angles with their direction of travel if they are not so aligned at the time they enter the conveyor section C. From the aligning conveyor section C, the laths are fed into a hopper or magazine D where they are stacked one upon another.

The magazine D is provided with an escapement mechanism which permits the bottom lath to be removed from the stack in the magazine by a conveyor E underneath the hopper D and having transversely aligned pair of short lugs 20 each connected to and located between a pair of sprocket chains 21, 22. The lugs 20 engage and withdraw the bottom lath from the magazine D. The single lath removed from the bottom of the stack in the magazine is carried by the pair of short lugs 20 which withdrew it from the magazine through a turnover station or mechanism F at which station the lath is turned side for side. Intermediate the pairs of short lugs 20, the chains 21, 22 are provided with transversely aligned pairs of long lugs 23 adapted to engage one or more bottom laths in the magazine D. Continued movement of the chains 21, 22 withdraws one or a plurality of additional laths from the magazine D depending upon the length or height of the lugs 23, in the present instance five, and deposits them on the turned over lath. The package thus formed is then transferred to a conveyor G which takes it to a desired destination.

The rolls 10 of the conveyor section A are rotatably supported in bearing brackets projecting upwardly from the vertical flanges of angle irons 30, 31 forming a part of the frame 32 of the conveyor section A. The particular construction of the frame 32 forms no part of the present invention. The rolls are driven by having their lower or bottom portions in continuous engagement with the outside of the upper reach of a belt 33 looped about suitable pulleys 34, 35 rotatably supported in the frame of the conveyor section adjacent to its opposite ends. The belt is driven by being reeved about a drive pulley on the shaft of a variable speed electric motor 36.

From the conveyor section A, the laths are fed onto the horizontal belts 11, 12 of the aligning conveyor section C located adjacent to opposite sides of the section and reeved about suitable pairs of pulleys 40, 41 fixed to shafts 42, 43 located adjacent to the feed-in and discharge ends of the section, respectively. The shafts 42, 43 are rotatably supported in the frame 44 of the aligning section C and the shaft 43 is driven by an electric motor 45 through a speed reduction unit 46 and a sprocket chain drive 47. The upper reaches of the belts 11, 12 are supported intermediate the respective pulley about which they are reeved by a plurality of idler rolls 48 rotatably supported in suitable bearing brackets connected to angle irons 50, 51 extending along opposite sides of the aligning section and forming a part of its frame. The belts are maintained taut by a take-up idler roll 52 which engages the inside of the lower reach of the belts and the opposite ends of which are rotatably supported in bearing brackets 53 located at opposite sides of the section. The bearing brackets 53 are slidably supported for vertical movement in guide members 54 at opposite sides of and forming a part of the frame of the aligning section C. The bearing brackets 53 are adapted to be adjusted vertically to adjust the tension on the belts 11, 12 by screws 55 threaded into nuts 56 welded to the guide members 54 and having their upper ends rotatably connected to the bearing brackets against linear movement relative thereto.

In addition to the horizontal belts 11, 12 the lath aligning section C comprises the pair of vertical belts 13, 14 previously mentioned and which are located along opposite sides of the aligning section adjacent to the entrance end thereof. The pulleys 15, 17 adjacent to the discharge end of the section and about which the belts 13, 14 are reeved, are secured to the upper ends of vertically extending shafts 60, 61 rotatably supported in suitable bearing brackets connected to angle irons 62, 63 at opposite sides of the section C and secured to the outside of the upstanding flanges of the angle irons 50, 51 previously referred to. The lower ends of the shafts 60, 61 are connected by miter gears to a transversely extending shaft 64 which shaft is driven from the shaft 43 through a sprocket chain drive 65. The pulleys 16, 18 at the opposite or feed-in ends of the belts 13, 14 are rotatably supported in bearing members 66, 67 slidably supported in pivoted frame members 70, 71 extending lengthwise of the aligning section at opposite sides thereof. The bearing members 66, 67 project through suitable slots in the frame members and are adapted to be adjusted lengthwise of the frame members and in turn the aligning section by pairs of adjusting screws 72, 73 at or adjacent to the entrance end of the aligning section. The opposite ends of the frame members 70, 71 are pivotally connected to stationary frame members 74, 75 of the aligning section by vertically extending shafts 76, 77 fixed in the frame. The shafts 76, 77 also carry pulleys 80, 81 for guiding the belts 13, 14 and more particularly the inner reaches thereof. The frame members 70, 71 are adjustable about the shafts 76, 77 to form an entrance or throat for the reception of laths fed to the aligning section C by the conveyor section A and are adapted to be secured in any adjusted position by means of bolts 82, 83 carried by the frame members and projecting through suitable arcuate apertures 84, 85 in the top flanges of the angle irons 62, 63 adjacent to the right-hand end of the aligning section.

The aligning section C is driven at a substantially higher speed than the conveyor section A and the speed is preferably such that as the laths travel therealong, succeeding laths or piles of laths, as the case may be, are spaced a predetermined distance regardless of whether or not they are spaced on the conveyor section A and such that when the laths are discharged therefrom, they have sufficient momentum to cause them to travel along series of rollers 90, 91 at opposite sides of the magazine D and to a position adjacent to a plate 92 forming the left-hand or rear wall of the magazine. The rollers 90, 91 form in effect a horizontal conveyor and are carried by a plurality of stud shafts fixedly secured to and projecting inwardly from bars 93, 94 located adjacent to opposite ends of the magazine. The bars 93, 94 are each connected by brackets 94, 95 to shafts or rods 96, 97 pivotally connected by bearing members 100, 101 to the frame 102 of the magazine section D. The shafts 96, 97 are operatively connected to double acting fluid pressure motors 105 located at opposite ends of the magazine and which normally hold the rollers 90, 91 in horizontal alignment with the top reaches of the belts 11, 12; that is, in position to engage underneath the end of laths fed by the aligning section C to the magazine D, but are adapted to move the rollers 90, 91 in a downwardly direction out of said position to drop laths supported thereon into the magazine proper.

Figure 5:
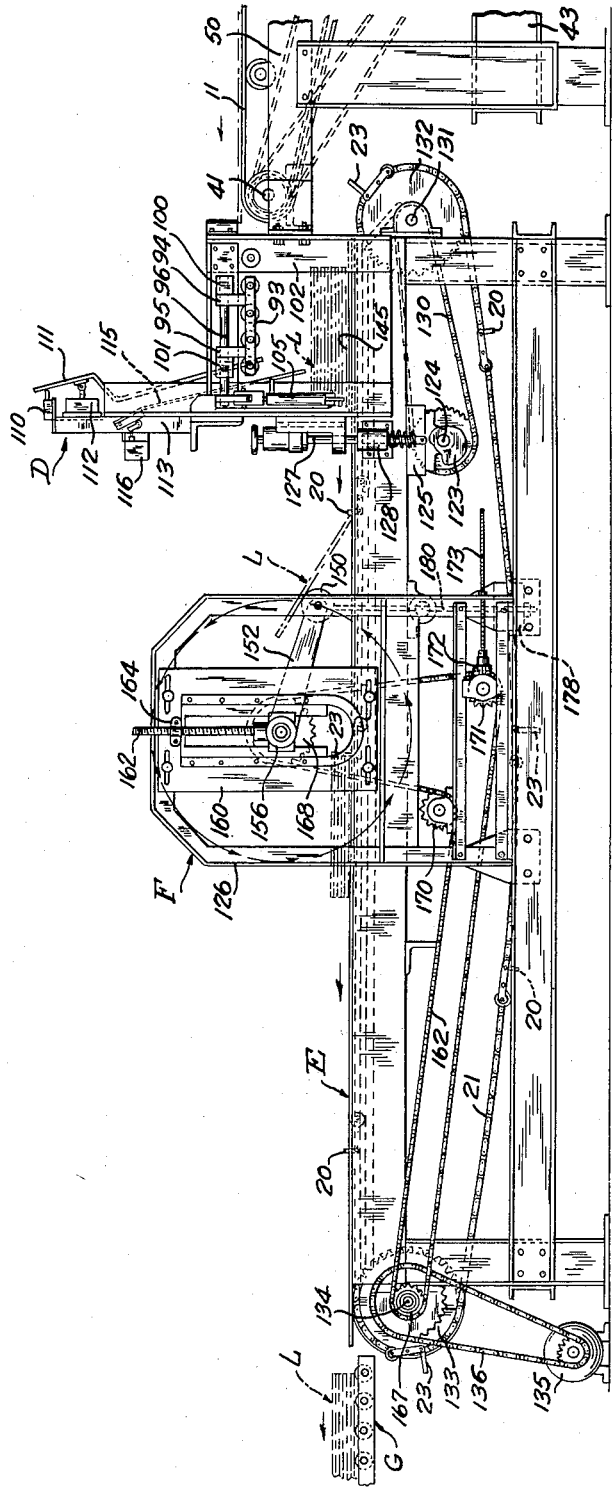
Fig. 5 is an enlarged fragmentary plan view of a portion of the apparatus shown in Fig. 1.
Figure 6:
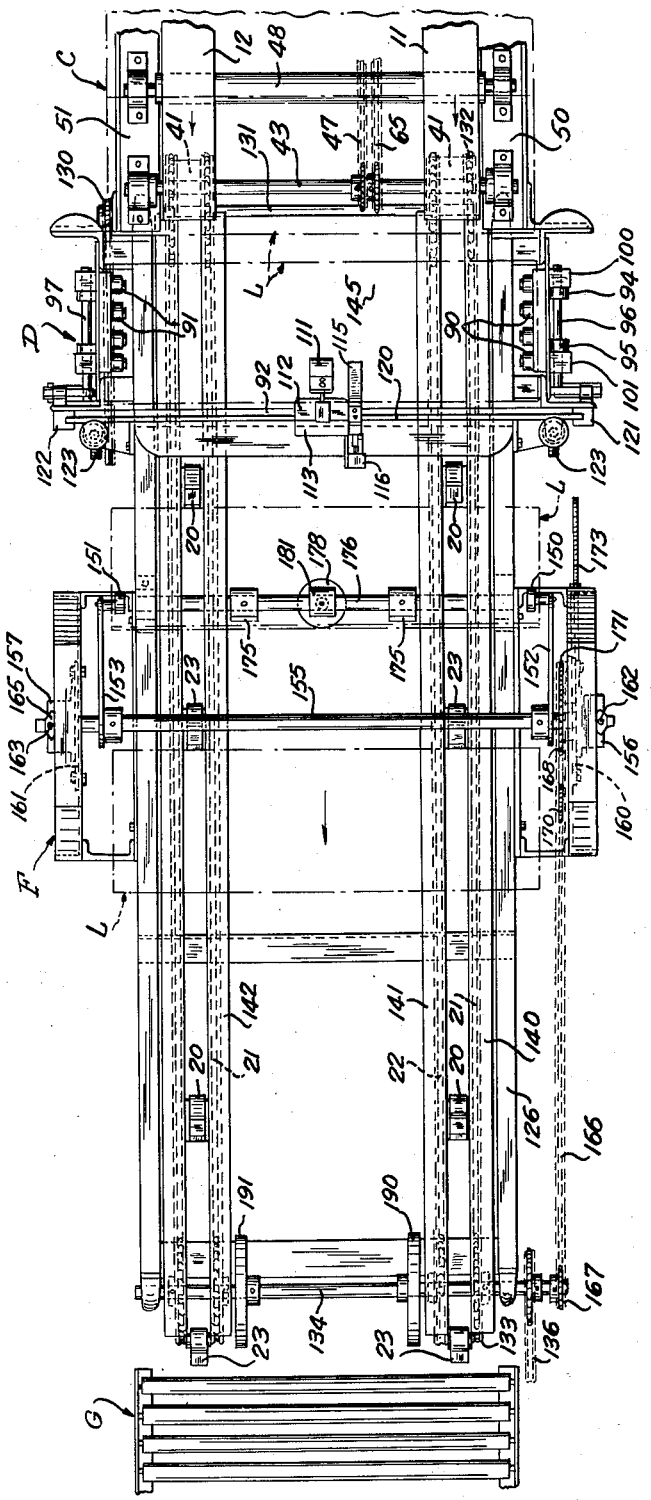
Fig. 6 is a side elevational view of the apparatus shown in Fig. 5.

The direction of operation of the motors 105 is controlled by a solenoid valve and the operation of dropping the rollers 90, 91 is initiated by the closing of an electric switch 110, the operating member of which normally engages the upper end of an angular lever 111 pivotally connected to a member 112 connected to an upstanding bracket 97 forming a part of the frame of the magazine D. The lower end of the lever 111 extends into the magazine proper in position to be engaged by a lath or laths fed onto the rollers 90, 91. As a lath or laths fed to the rollers approaches the rear or left-hand end of the magazine, the switch 110 is actuated to reverse the direction of flow of fluid pressure to the motors 105 with the result that the rollers are withdrawn from underneath the lath and the latch permitted to drop into the hopper of the magazine. As shown, the lever 111 is gravity biased into the position shown in Fig. 5 of the drawings, but it may be spring biased into this position, if desired. The direction of flow of fluid pressure to the motors 105 is reversed after a time delay which permits the lath or laths to drop clear of the rollers 90, 91.

A second control lever 115, the upper end of which is pivotally connected to the bracket 113 and the lower end of which projects about half way into the hopper of the magazine is adapted to be engaged by laths in the hopper when the laths reach a predetermined height to actuate a control switch 116 to stop the conveyor sections A and C.

The plate 92 previously referred to and which forms the left or rear side of the hopper does not extend to the bottom of the hopper but stops short thereof and the part of the hopper between the lower edge of the plate 92 and the bottom of the hopper, with the exception of the space big enough for one lath to pass therethrough, is closed by a vertically slidable member in the form of a plate 120, the opposite ends of which are slidably supported in grooves formed in brackets 121, 122 fixed to a part of the frame of the magazine. The plate 120 is adapted to be reciprocated by cams 123 at opposite sides of the magazine, which cams are fixedly secured to a transversely extending shaft 124 rotatably supported in bearing brackets 125 secured to the frame 126 of the magazine turnover mechanism, etc. The cams 123 are engaged by rollers secured to the lower ends of shafts 127 slidably supported in brackets 128 also secured to the frame 126. The upper ends of the shafts 127 are adjustably connected to the plate 120 adjacent to opposite ends thereof. The construction is such that the plate 120 is raised and lowered by the cams 123 upon each rotation of the shaft 124.

The shaft 124 is connected by a sprocket chain drive 130 to a shaft 131 rotatably supported in bearing brackets connected to the frame 126 and which carries the sprocket wheels 132 about which the sprocket chains 21, 22, previously referred to, are reeved at the feed or right-hand end of the conveyor section E. The sprocket chains 21, 22 are also reeved about sprocket wheels 133 at the other or left-hand end of the apparatus. The sprocket wheels 133 are fixed to a transversely extending shaft 134 rotatably supported in the left-hand end of the frame 126 and driven by an electric motor 135 through a sprocket chain drive 136. The upper reaches of the sprocket chains 21, 22 are slidably supported in pairs of channel irons 140, 141 and 142, 143 forming a part of the frame 126.

As a transversely aligned pair of short lugs 20 on the sprocket chains 21, 22 pass through the bottom part of the hopper or magazine, they engage the rear or right-hand edge of the bottom lath in the hopper and push it through the open slot in the left-hand side of the magazine. The bottom of the magazine is formed in part by a plate 145 connected to the top of the channels 141, 142 and extending therebetween the thickness of which plate is equal to the thickness of one of the laths being handled. As the lath which is being carried forward by the short lugs 20 moves off of the plate 145, it drops upon the tops of the channels 140—143 and as it continues in its travel therealong, a pair of rollers 150, 151 connected to the ends of rotating arms 152, 153 engaged underneath the leading edge of the lath and raise the leading edge of the lath while the trailing edge remains engaged with the lugs 20 with the result that the lath is turned back over the lugs 20 and positioned on the upper edges of the channels 140—142 immediately in front of the magazine.

The levers 152, 153 to the ends of which the rollers 150, 151 are rotatably connected are fixedly secured to a transversely extending shaft 155 rotatably supported in bearing brackets 156, 157 slidably supported in guide plates or members 160, 161 located at opposite sides of the apparatus and connected to the frame 126 for adjustment lengthwise of the direction of travel of the lath through the apparatus. The bearing brackets 156, 157 are adjustable vertically in the guide members 160, 161 therefore by vertically extending elongated screws 162, 163 having threaded engagement with members 164, 165 fixed to the guide members 160, 161 and to the lower end of which screws the bearing brackets are rotatably connected against axial movement relative to the screws. The shaft 155 is adapted to be rotated in timed relation to the travel of the sprocket chains 21, 22 by a sprocket wheel drive comprising a sprocket chain 166 reeved about a drive sprocket 167 on the shaft 134 and a driven sprocket 168 on the shaft 155. The upper reach of the sprocket chain 166 passes underneath a sprocket 170 rotatably connected to the frame of the apparatus and the lower reach passes underneath a tension adjusting sprocket 171 rotatably connected to a bracket 172 slidably supported in the frame 120 for movement lengthwise of the direction of travel of laths through the apparatus and adjustable relative to the frame by a screw 173 having threaded engagement with a part of the frame and having its left-hand end as viewed in Fig. 5 rotatably supported in the bracket 172 against linear movement relative thereto.

The pairs of short and long lugs 20, 23 connected to the pairs of sprocket chains 21, 22 are alternately arranged along the chains and as a pair of transverse aligned long lugs 23 approach the magazine, the gate or plate 120 is raised by the cams 123 and as the long lugs pass through the magazine, they push a plurality of laths from the magazine and on top of the lath removed by the immediately preceding transversely arranged pair of short lugs 20, which lath has in the interim been turned side for side and is resting upon the channel members 140—143 immediately to the left of the magazine. The fact that the bottom of the magazine; that is, the top of the plate 145 is raised above the upper edges of the channels 140—143 a distance equal to the thickness of a lath, the laths being removed from the magazine by the high lugs 23 are readily slid over the lath previously removed from the magazine. Any tendency of the bottom lath to slide forwardly on the channels 140—143 is prevented by counterweighted levers 175 connected to a transversely extending shaft 176 rotatably supported in the frame, the upper ends of which levers normally project slightly above the top of the channels 140—143. The counterweight is designated 178 and is adjustably connected to the lower end of a rod 180, the upper end of which is fixed to the shaft 176 by a clamp bracket 181.

As the package of laths carried through the apparatus by the high lugs of the sprocket chains 21, 22 reach the discharge end, they engage a pair of rubber faced rolls or wheels 190, 191 fixed to the shaft 134 immediately to the inside of the channels 141, 142, the diameters of which are slightly larger than that of the sprocket wheels 133. Since the wheels 190, 191 are slightly larger in diameter than the sprocket wheels, the wheels project above the level of the channels 21, 22 and as the packages of laths pass thereover, they are accelerated by the wheels a sufficient amount to clear them of the lugs 23 of the chains so that the laths will not be damaged by the lugs as they travel around the sprocket wheel. The acceleration of the packages of laths referred to feed them to the discharge conveyor G of any desired construction, along which they continue their movement to a predetermined destination.

While the preferred embodiment of the present invention has been described in considerable detail, the invention is not limited to the particular apparatus and constructions shown and it is the intention to cover all adaptations, modifications, and uses thereof which come within the practice of those skilled in the art to which the invention relates and the scope of the appended claims.

What is claimed is:

1. In apparatus for handling rigid sheet-like articles, hopper means adapted to hold a plurality of sheet-like articles transferred thereto, first conveyor means for feeding sheet-like articles to said hopper means, said hopper means having an opening in one side adjacent to the bottom thereof, means in said hopper means for discontinuing the operation of said first conveyor means upon the articles in said hopper means reaching a predetermined height, second conveyor means underneath said hopper means and a distance below the bottom of said opening slightly greater than the thickness of one of said articles, said second conveyor means comprising means for withdrawing the bottom one of said articles in said hopper means therefrom through said opening, and means at the discharge side of said hopper means for turning said one article withdrawn from said hopper means in a clockwise direction bottom side up and placing it on said second conveyor means adjacent to said opening, said second conveyor means also comprising means for removing a second article from said hopper means through said opening and placing it on top of said first article.

2. In apparatus for handling sheet-like articles, a first conveyor means adapted to engage underneath sheet-like articles, means for feeding sheet-like articles to said first conveyor means, means for supporting said first conveyor means for movement into and out of a position in which it engages underneath articles fed thereto, power means for moving said first conveyor means into and out of said position, a hopper adapted to hold a plurality of articles transferred thereto from said first conveyor means and having an opening in one side adjacent to the bottom thereof, means in said hopper for discontinuing the feed of articles to said hopper upon the articles therein reaching a predetermined height, a second conveyor underneath said hopper, means on said second conveyor for withdrawing the bottom one of said articles in said hopper from said hopper through said opening, means adjacent to said second conveyor and to the discharge side of said hopper for turning said one article withdrawn from said hopper bottom side up, means operated in timed relation to the operation of said second conveyor for varying the size of said opening between a size which will permit passage of a single article therethrough and a size which will permit passage of a plurality of articles therethrough, and means on said second conveyor for removing a plurality of articles from said hopper through said opening and placing them on top of said first article.

3. In apparatus for handling rigid sheet-like articles, a first conveyor means adapted to engage underneath opposite ends of rectangularly shaped sheet-like articles, means for feeding rectangularly shaped sheet-like articles to said first conveyor means, means for supporting said first conveyor means for movement into and out of a position in which it engages underneath opposite ends of articles fed thereto, power means for moving said first conveyor means into and out of said position, hopper means underneath said first conveyor means adapted to hold a plurality of articles transferred thereto from said first conveyor means and having an opening in one side adjacent to the bottom thereof, means actuated by the presence of an article on said first conveyor means for controlling the actuation of said power means to move said first conveyor means from said position to transfer an article thereon to said hopper means, means in said hopper means for discontinuing the feed of articles to said first conveyor means upon the articles in said hopper means reaching a predetermined height, second conveyor means underneath said hopper means, means on said second conveyor means for withdrawing the bottom one of said articles in said hopper means from said hopper means through said opening, means adjacent to said second conveyor means and to the discharge side of said hopper means for turning said one article withdrawn from said hopper means bottom side up, means operated in timed relation to the operation of said second conveyor means for varying the size of said opening between a size which will permit passage of a single article therethrough and a size which will permit passage of a plurality of articles therethrough, and means on said second conveyor means for removing a plurality of articles from said hopper means through said opening and placing them on top of said first article.

4. In apparatus for handling rigid sheet-like articles, a first conveyor means adapted to engage underneath opposite ends of rectangularly shaped sheet-like articles, second conveyor means for feeding rectangularly shaped sheet-like articles to said first conveyor means, means for supporting said first conveyor means for movement into and out of a position in which it engages underneath opposite ends of articles fed thereto, power means for moving said first conveyor means into and out of said position, hopper means underneath said first conveyor means adapted to hold a plurality of articles transferred thereto from said first conveyor means and having an opening in one side adjacent to the bottom thereof, means actuated by the presence of an article on said first conveyor means for controlling the actuation of said power means to move said first conveyor means from said position to transfer an article thereon to said hopper means, means in said hopper means for discontinuing the operation of said second conveyor means to feed articles to said first conveyor means upon the articles in said hopper means reaching a predetermined height, third conveyor means underneath said hopper, means on said third conveyor means for withdrawing the bottom one of said articles in said hopper means therefrom through said opening, means adjacent to said third conveyor means and to the discharge side of said hopper means for turning said one article withdrawn from said hopper means bottom side up, means operated in timed relation to the operation of said second conveyor means for varying the size of said opening between a size which will permit passage of a plurality of articles therethrough, means on said third conveyor means for removing a plurality of articles from said hopper means through said opening and placing them on top of said first article, and means for accelerating the speed of movement of a stack of articles on said third conveyor means as it reaches the end of said third conveyor means.

5. In apparatus for handling rigid sheet-like articles, hopper means adapted to hold a plurality of sheet-like articles transferred thereto, first conveyor means for feeding sheet-like articles to said hopper means, said hopper means having an opening in one side adjacent to the bottom thereof, means in said hopper means for discontinuing the operation of said first conveyor means upon the articles in said hopper means reaching a predetermined height, a second conveyor means underneath said hopper means spaced a predetermined distance below the bottom of said opening, said second conveyor means comprising means for withdrawing the bottom of said articles in said hopper means therefrom through said opening, and means at the discharge side of said hopper means for turning said article withdrawn from said hopper means in a clockwise direction bottom side up and placing it on said second conveyor means adjacent to said opening, said second conveyor means also comprising means for removing another article from said hopper means through said opening and placing it on top of said first article.

References Cited in the file of this patent

UNITED STATES PATENTS

| | | |
|---|---|---|
| 931,646 | Price | Aug. 17, 1909 |
| 1,966,878 | Bluzat | July 17, 1934 |
| 2,315,003 | Martin et al. | Mar. 30, 1943 |
| 2,345,937 | Joa | Apr. 4, 1944 |
| 2,605,910 | Kovatch | Aug. 5, 1952 |
| 2,645,329 | Blair | July 14, 1953 |
| 2,667,259 | Parker | Jan. 26, 1954 |
| 2,807,390 | Bonebrake | Sept. 24, 1957 |